Patented Mar. 30, 1954

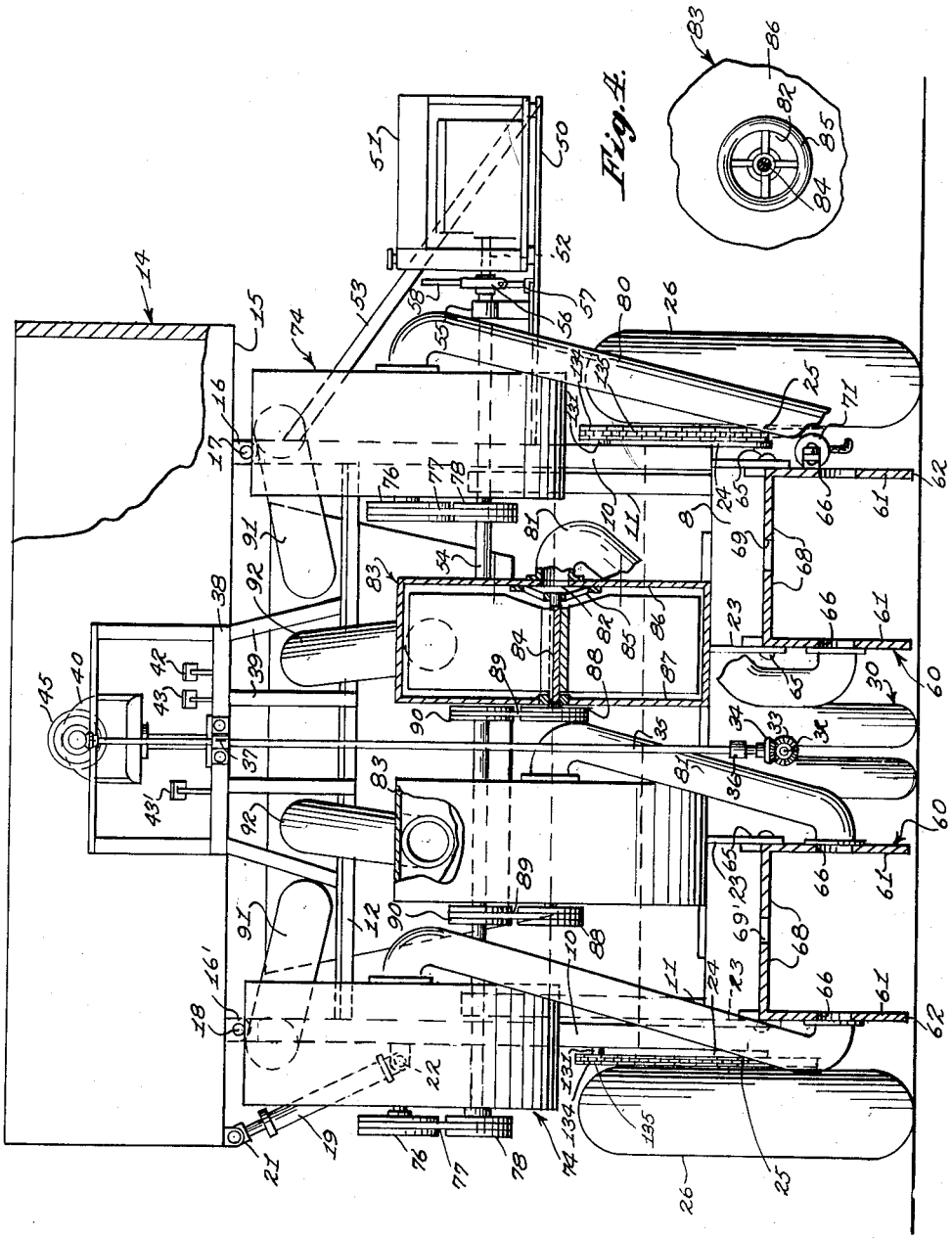

2,673,436

UNITED STATES PATENT OFFICE 2,673,436

COTTON PICKER

Charlie J. Urban, Weinert, Tex.

Application August 25, 1950, Serial No. 181,403

3 Claims. (Cl. 56—12)

This invention relates to an improved motorized, multiple-row, suction cotton picker, and the primary object of the invention is to provide a more efficient device of this kind having a higher operating capacity accompanied by less damage to the cotton picked, whereby the consumption of time and the expense of cotton picking can be reduced.

Another important object of the invention is to provide a wheeled cotton picker of the character indicated above which moves along the plant rows and picks the cotton from the plants by suction, blows the picked cotton into a condenser hopper, withdraws the cotton therefrom by gravity and by suction into contact with successive beater cylinders, withdraws the beaten cotton from the region of the final beater cylinder by suction, and blows the withdrawn cotton into a collection hopper carried by the picker from which the cotton can be discharged or dumped into trucks accompanying the picker as it moves along.

Other important objects and advantageous features of the invention will be apparent from the following description and the accompanying drawings, wherein, for purposes of illustration only, a specific embodiment of the invention is set forth in detail.

In the drawings, wherein like numerals designate like parts throughout the several views:

Figure 3 is a front elevation, with portions broken away and shown in section; and Figure 4 is a fragmentary view, on an enlarged scale, of the blower shaft support spider.

Figure 1:
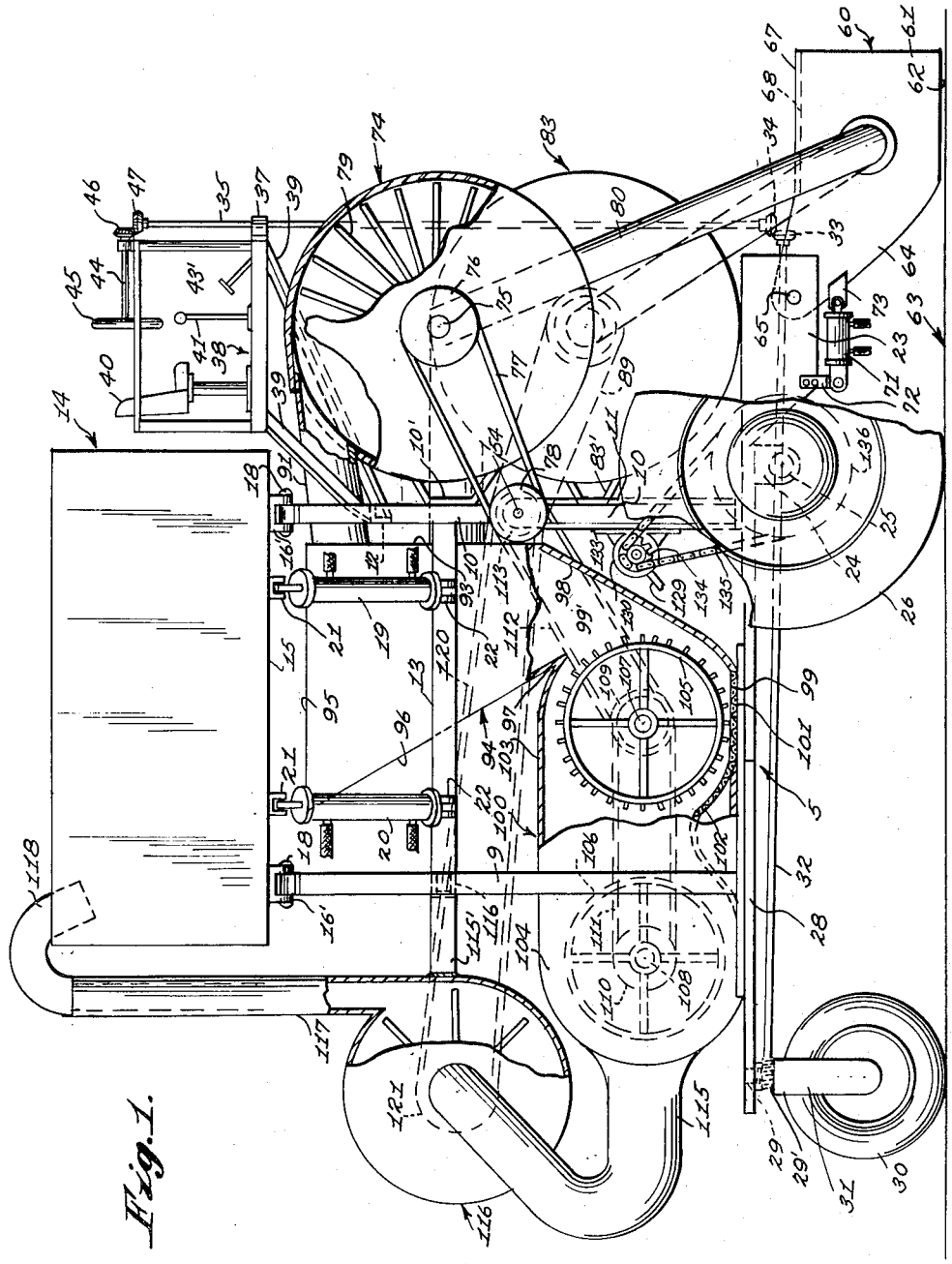
Figure 1 is a right-hand side elevation, portions of the device being omitted and other portions being broken away to show internal mechanism.

Referring in detail to the drawings, the illustrated device comprises a generally rectangular, open, horizontal frame 5 involving longitudinal side members 6, a transverse rear member 7, and a transverse front member 8. Rear vertical members or uprights 9 rise from the side members 6 near the ends of the rear member 7, and front vertical members or uprights 10 and 11 rise from the side members 6 near the forward end of the frame 5. As shown in Figure 3, the front vertical members 10 are the same height as, and longitudinally aligned with, the rear vertical members 9, while the front vertical members 11 are substantially shorter than, and positioned at the laterally inward sides of the front vertical members 10. A horizontal cross member 12, located above the shorter front vertical members 11 and below the upper ends of the taller front vertical members 10, is connected to and extends between the members 10. Below the level of the cross member 12, but above the level of the shorter vertical members 11, longitudinal members 13 extend between and are connected to the front and rear vertical members 10 and 9 at the opposite sides of the frame 5.

A rectangular, transversely elongated collecting and discharging hopper 14 having an imperforate plane bottom 15 is supported on the upper ends of the rear and front vertical members 9 and 10. At the left-hand side of the device the hopper bottom 15 has pairs of spaced lugs 16 depending therefrom and engaging the front and rear sides of the vertical members 9 and 10, with pivot pins 17 traversing the lugs 16 and the upper ends of the vertical members, whereby the hopper 14 is supported for tilting toward the left-hand side of the device for discharging cotton accumulated therein into trucks positioned at the left-hand side of the device. The hopper bottom 15 has similar spaced pairs of lugs 16' to similarly engage the upper ends of the vertical members 9 and 10 at the right-hand sides of the device, but the pivot pins 18 traversing those pairs of lugs 16 and the associated vertical members 9 and 10 are made removable to permit the necessary upward movement of the hopper 14 involved in tilting the hopper 14. Two hydraulic jacks 19 and 20 are pivoted at opposite ends, as indicated at 21 and 22, respectively, to the right-hand end of the hopper bottom 15, and to the longitudinal member 13 extending between the vertical members 9 and 10 at the right-hand side of the frame 5, the jacks being adapted to be extended and contracted to effect the tilting and righting of the hopper 14 by suitable means (not shown).

Forwardly of the front vertical members 10 the frame side members 6 are deepened to provide depending flanges 23. Behind the flanges 23 are depending lugs 24 having stub shafts 25 on which relatively large pneumatic tired wheels 26 are mounted outwardly of and on opposite sides of the frame 5. The frame 5, as indicated in dotted lines in Figure 2, has an intermediate transverse member 27 extending between and connected to the side members 6 forwardly from the rear transverse member 7. The rear transverse member 7 has a central discontinuous portion, and rearwardly converging members 28 are connected at their forward ends to the side members 6 and to the ends of the intermediate transverse member 27, to the rear transverse member 7, and the rear ends of the converging members 28 are connected together and vertically apertured to provide a journal 28' for the spindle 29 of the paired dirigible, ground-engaging wheels 30. The wheels 30 are mounted in a fork 31 from which the spindle 29 rises, and a worm and worm wheel connection 29' is made between the spindle 29 and the rear end of a longitudinal, horizontal rotary shaft 32 which is positioned beneath the frame 5 and has a bevel pinion 33 on its forward end in mesh with a bevel pinion 34 on the lower end of a vertical rotary shaft 35. The lower part of the vertical shaft 35 is mounted in a bearing 36 on the front transverse member 8 of the frame 5, while the upper part of the shaft 35 is mounted in a bearing 37 on the front of the driver's or operator's platform 38 which is supported on the frame 5 forwardly of the hopper 14 by forwardly inclined braces 39 secured to the cross member 12 which extends between the front vertical members 10.

On the platform 38, which is on a level with the lower part of the hopper 14 is a seat 40 in front of which is a gear-shift lever 41, clutch and brake pedals 42 and 43, respectively, and a steering column mounting a longitudinal, horizontal shaft 44 having a steering wheel 45 on its rear end and a bevel pinion 46 on its forward end in mesh with the bevel pinion 47 on the upper end of the shaft 35. Rotation of the steering wheel 45 acts to turn the dirigible wheels 30, whereby the device can be steered by the driver or operator to accurately follow the adjacent rows of cotton plants (not shown). Suitable draft means (not shown) are provided on the front transverse frame member 8 for connection to a tractor (not shown) for pulling the device over the ground in a picking operation.

On the left-hand side of the frame 5, a platform 50 is fixed to project laterally outwardly from the left-hand front vertical member 10 to support a powerful motor 51, such as an internal combustion engine, having a laterally inwardly projecting crankshaft extension 52. A diagonal brace 53 extends between an upper part of the front vertical member 10 and the motor platform 50.

Extending through the front vertical members 10 and journaled in the upper ends of the shorter front vertical members 11 is the drive shaft 54 which is aligned with the engine crankshaft extension 52, the adjacent end of the drive shaft 54 being journaled in, and extending through, a bracket 55 rising from the engine platform 50. A clutch 56 is interposed between the engine crankshaft extension 52 and the adjacent end of the drive shaft 54, having operating mechanism including a part 57 mounted on the platform 50 and an operating lever 58 which is connected in a suitable manner (not shown) to the clutch pedal 42 on the driver's platform 38. The brake pedal 43 is connected in suitable manner (not shown) to a suitable brake (not shown) associated with the drive shaft 54. These provisions enable the driver to start, run and stop the cotton picking and handling mechanism, hereinafter described, as may be necessary or desirable, while the engine or motor 51 is operating. If desired, a suitable combined change-speed transmission and reduction gearing (not shown) may be interposed in connection with the drive shaft 54 with the engine 51, to be operated by the gear-shift lever 41 on the driver's platform 50. The pedal 43' is provided for operating the hydraulic jacks.

The cotton picking and handling mechanism driven from the drive shaft 54 comprises the two suction hoods 60 which are laterally spaced apart at the distance of two adjacent rows of cotton plants and project forwardly from the front transverse frame member 8 and are on a level below the depending flanges 23. Each suction hood 60 comprises a pair of similar vertical longitudinal side walls 61 which are laterally spaced apart at a distance to clear opposite sides of the cotton plants in a row. The side walls 61 have straight lower edges 62 arranged to run close to and substantially parallel with the ground 63 traversed by the device. Each hood 60 is connected to the frame 5 for tilting up and down movement about a horizontal axis to thereby raise and lower the hood with respect to a ground surface. Specifically, rearwardly and upwardly extending, tapered ears 64 on the rear portion of the side walls 61 are journaled on horizontal, transverse pivots 65 on the depending flanges 23, whereby the hoods can be tilted to raise or lower them with respect to the ground 63 to meet existing ground conditions. The side walls 61 are of sufficient height to reach above the tops of the cotton plants which pass between the side walls as the picker is moved forwardly over the ground 63. The side walls are provided with relatively large ports 66 located near rearward ends of and intermediate the lower edges 62 and the upper edges 67 of the side walls. The upper edges 67 are generally parallel to the lower edges 62 and have guide flanges 68 extending along the facing sides of the side walls having spaced parallel facing guide edges 69 forming a slot 69' through which the cotton plants are forced to pass rearwardly in compacted condition. The plants are guided into the slot 69' by rearwardly and inwardly curved, forward end edges 70 on the guide flanges 68. Means for raising and lowering the suction hoods 60 comprise hydraulic jacks 71 located beneath the flanges 23 and connected at opposite ends to brackets 72 depending from the flanges 23 and lugs 73 projecting rearwardly from the hood ears 64. Suitable means (not shown) for operating the jacks 71 is provided.

Positioned in front of the front vertical frame members 10 and mounted thereon by means of brackets 10' in vertically spaced relation to the frame 5 are two outer rotary blower casings 74 having horizontally extending rotor shafts 75 having pulleys 76 on their exposed, laterally inward ends, which are connected by belts 77 to pulleys 78 on the drive shaft 54. Within the casings 74 the rotor shafts 75 carry radial bladed rotors 79. From central portions of sides of the rotor casings 74 flexible suction pipes 80 lead downwardly and forwardly and connect with the ports 66 in the laterally outward side walls 61 of the two suction hoods 60.

The ports 66 in the laterally inward side walls 61 of the two suction hoods 60 have connected thereto the lower ends of flexible pipes 81 which lead upwardly and rearwardly and are connected to central ports 82 in sides of two lower or inner, laterally spaced blower casings 83 which are supported by brackets 83' on the frame 5 on a lower level than the blower casings 74 and are spaced between and in vertical alignment with the upper or outer blower casings 74. Their centralized rotor shafts 84 have one end rotatably supported on spiders 85 secured to the blower casing side 86 around the ports 82, as shown in Figures 3 and 4, the other ends of the shafts 84 being journalled through the opposite blower casing sides 87. The exposed ends of the shafts 84 have pulleys 88 which are connected by belts 89 to pulley 90 on the drive shaft. The upper parts of the blower casings 74 and 83 have tangential outlet pipes 91 and 92, respectively, extending rearwardly therefrom.

Figure 2:
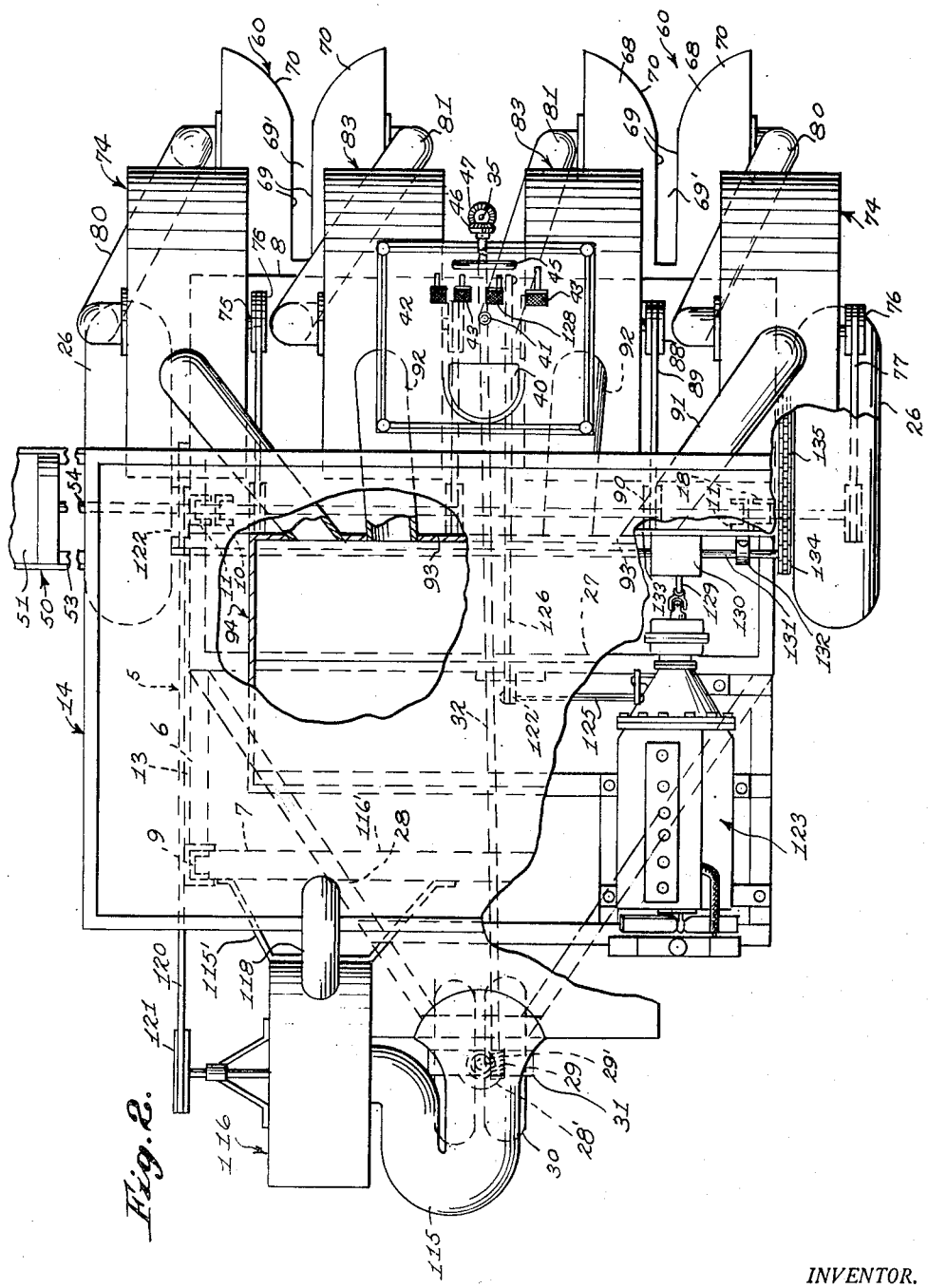
Figure 2 is a fragmentary top plan view, partly broken away.

The rearward ends of outlet pipes 91 and 92, which are in transversely spaced relation corresponding to the relative positions of the blower casings and in horizontal alignment, open through the upper part of the vertical front wall 93 of the condenser or receiving hopper 94, which is centrally supported on the frame 5 between the rear and front vertical members 9 and 10. The hopper 94, as indicated in dotted lines in Figure 2, is of transversely elongated, rectangular, horizontal cross-section and has a closed top 95. The rear wall 96 of the hopper 94 declines forwardly, as shown in Figure 1, to the point 97. On a corresponding level the front wall 93 has a rearwardly declining portion 98 which terminates at the point 99. The side walls of the hopper 94 in conjunction with the declining wall portions 96 and 98 form a throat 99' opening into the forward end of the closed beater casing 100.

The beater casing 100 is supported on and extends rearwardly along the frame 5 behind the receiving hopper 94, and besides side walls has a bottom wall 101 coextensive with the lower end of the receiving hopper wall portion 98. The bottom wall 101 is perforated to discharge onto the ground 63 debris separated from the cotton as it is beaten in the beater casing 100, and has an upwardly curved intermediate portion 102. The beater casing 100 includes a horizontal top wall 103 which leads rearwardly from the lower end of the rear wall 96 of the receiving hopper 94. A semicylindrical casing portion 104 in the rear end of the beater casing 100 has joined thereto at top and bottom the rear ends of the top and bottom walls 103 and 101, respectively. First and second conventional raddle-equipped beater cylinders 105 and 106, respectively, are positioned in the beater casing 100 in front of and behind the intermediate bottom wall portion 102, the beater cylinders having shafts 107 and 108, respectively, journaled in the sides of the beater casing and having exposed ends equipped with pulleys 109 and 110, respectively, which are connected by a belt 111. The pulley 109 is connected by a belt 112 to a pulley 113 on the drive shaft 54.

Leading rearwardly from the semicylindrical beater casing portion 104 is a diametrical suction pipe 115 which is connected centrally to one side of a blower casing 116 supported by brackets 115' to a cross member 116' extending between the uprights 9 above the rear of the frame 5 and behind the collector hopper 14, and driven by a belt 120 over the shaft pulley 121 and over the pulley 122 on drive shaft 54. The blower casing 116 has a tangential outlet pipe 117 rising therefrom and terminating in a downturned, rotatable gooseneck 118 discharging into the hopper 14.

Mounted on the right rear corner of the chassis frame 5 is the motor or engine 123 which drives the device forwardly over the ground 63. The engine 123 has on the forward end thereof a clutch assembly 124 controlled by a laterally inwardly extending lever 125 connected at its laterally inward end to the rear end of a longitudinal rod 126 by a rocker arm 127. The rod 126 extends forwardly and is connected at its forward end to the clutch pedal 128 on the platform 38 and located between the brake pedal 43 and the jack pedal 43'.

A universal joint 129 connects the shaft of the clutch assembly 124 with a differential 130 having a shaft 131 extending across the frame 5 and mounted in journal brackets 132 on a plate 133 extending across the frame and secured to the rear of the front uprights 10. The shaft 131 has sprockets 134 on its opposite ends over which are trained sprocket chains 135 which are trained also over sprocket wheels 136 on the wheels 26. Suitable controls (not shown) for the operation of the engine 123 are included therein.

In operation, the device is moved down forwardly along the ground 63 by the engine 123, with the engine 51 running and the clutch 56 engaged, the various blowers and beater cylinders thereby being in operation, the suction applied in the suction hoods 60 removes the cotton from the plants passing through the hoods. The cotton then passes through the blower casings 74 and 83 and is discharged into the receiving or condenser hopper 94, wherein the cotton becomes more densely packed together and subsides by its own weight and by the suction exerted through the beater casing 100 into contact with the first beater cylinder 105 which rotates counterclockwise. The cotton is thereby beaten and passed rearwardly into engagement with the second or final beater cylinder 106, which also rotates counterclockwise, whereby the beaten cotton is passed into the rearward end of the beater casing 100. In this transit, stalks and other debris entrained in the cotton is beaten out and falls to the ground 63 through the perforated bottom 101 of the beater casing 100.

The beaten cotton is sucked from the rearward end of the beater casing 100, passes through the blower casing 116, and is blown upwardly through the outer pipe 117 and discharged from the gooseneck 118 into the hopper 14. The contents of the hopper 14 are discharged therefrom by extending the jacks 19 and 20 so as to tilt the hopper 14 to load an accompanying truck (not shown) positioned at the left-hand side of the device.

I claim:

1. In a cotton picker, a mobile frame, a pair of upstanding hoods arranged in parallel spaced relation positioned longitudinally of and below said frame adjacent the forward end of the latter and each connected to said frame for tilting up and down movement about a horizontal axis to thereby raise and lower the hoods with respect to a ground surface, each of said hoods having spaced side walls, there being a port in each of the side walls of each hood, a vertically disposed suction blower positioned above and adjacent each of the side walls of each hood and supported on said frame, a pipe connecting the port of each side wall of each hood to the adjacent blower, a receiving hopper fixedly supported on said frame contiguous to and connected in communication with all of said blowers, and means operatively connected to each of said hoods for effecting the tilting movement of the latter.

2. In a cotton picker, a mobile frame, a pair of upstanding hoods arranged in parallel spaced relation positioned longitudinally of and below said frame adjacent the forward end of the latter and each connected to said frame for tilting up and down movement about a horizontal axis to thereby raise and lower the hoods with respect to a ground surface, each of said hoods having spaced side walls, a pair of horizontally disposed guide flanges extending longitudinally along the upper ends of the side walls of each hood, the guide flanges being spaced from each other to form a slot for receiving and forcing the cotton plants to pass rearwardly in compacted condition, there being a port in each of the side walls of each hood, a vertically disposed suction blower positioned above and adjacent each of the side walls of each hood and supported on said frame, a pipe connecting the port of each side wall in each hood to the adjacent blower, a receiving hopper fixedly supported on said frame contiguous to and connected in communication with all of said blowers, and means operatively connected to each of said hoods for effecting the tilting movement of the latter.

3. In a cotton picker, a mobile frame, a pair of upstanding hoods arranged in parallel spaced relation positioned longitudinally of and below said frame adjacent the forward end of the latter and each connected to said frame for tilting up and down movement about a horizontal axis to thereby raise and lower the hoods with respect to a ground surface, each of said hoods having spaced side walls, the lower end edges of the side walls of each hood being straight, a pair of horizontally disposed guide flanges extending longitudinally along the upper ends of the side walls of each hood, the guide flanges being spaced from each other to form a slot for receiving and forcing the cotton plants to pass rearwardly in compacted condition, there being a port in each of the side walls of each hood, a vertically disposed suction blower positioned above and adjacent each of the side walls of each hood and supported on said frame, the suction blowers adjacent the side walls of each hood being of unequal size, a pipe connecting the port of each side wall of each hood to the adjacent blower, a receiving hopper fixedly supported on said frame contiguous to and connected in communication with all of said blowers, and means operatively connected to each of said hoods for effecting the tilting movement of the latter.

CHARLIE J. URBAN.

References Cited in the file of this patent
UNITED STATES PATENTS

| Number | Name | Date |
|---|---|---|
| 580,333 | Crowell | Apr. 6, 1897 |
| 830,102 | Richmond | Sept. 4, 1906 |
| 946,454 | Mays | Jan. 11, 1910 |
| 949,260 | Childs | Feb. 15, 1910 |
| 1,095,572 | Heffley | May 5, 1914 |
| 1,149,253 | Dickerson | Aug. 10, 1915 |
| 1,219,204 | Ward | Mar. 13, 1917 |
| 1,314,437 | Silverthorne | Aug. 26, 1919 |
| 1,332,425 | Cassel | Mar. 2, 1920 |
| 1,400,522 | Connon | Dec. 20, 1921 |
| 1,502,216 | Threadgill | July 22, 1924 |
| 1,515,826 | Bohn | Nov. 18, 1924 |
| 2,241,423 | Rust | May 13, 1941 |
| 2,518,465 | Hagen et al. | Aug. 15, 1950 |